Jan. 1, 1935. G. H. WINGATE 1,986,089

SPECTACLES AND SPECTACLE FRAMES

Filed Aug. 26, 1932

INVENTOR
Gerald H. Wingate
by his attorneys
Byrnes, Stebbins, Parmelee & Blenko

Patented Jan. 1, 1935

1,986,089

UNITED STATES PATENT OFFICE 1,986,089

SPECTACLES AND SPECTACLE FRAMES

Gerald Henry Wingate, London, England

Application August 26, 1932, Serial No. 630,515
In Great Britain December 1, 1931

1 Claim. (Cl. 88—41)

This invention consists of improvements in or relating to spectacles and spectacle frames, and has for one of its objects to provide spectacles which will afford the fullest view when the eyes are turned in all directions. Considering the case of a sportsman, it is often important to glance rapidly upwards or downwards or sideways without a bodily movement of the head, and another object of this invention is to provide spectacles suitable for sportsmen.

Various attempts have been made to provide spectacles which give a large field of vision, for example by using large round lenses or by using large lenses with a flat or flattened upper edge.

According to this invention, the spectacle frame and/or lenses are so shaped that looking directly at the wearer in front elevation, the line of junction of lens and frame has a somewhat flattened top which slopes outwardly and upwardly from a point near the bridge towards the temple.

In a preferred form of this invention, the spectacle frame and/or lenses are so shaped that looking directly at the wearer in front elevation, the line of junction of lens and frame is of a curved triangular form with an upper edge sloping upwards and outwards from a point near the bridge towards the temple.

According to a feature of the invention, the apex of the curved triangular lens is near the bridge, the upper edge of the lens slopes outwardly and upwardly towards the temple, the outer edge of the lens although curved is substantially vertical, and a third corner of the triangle (although smoothly curved) comes at a point slightly outside the vertical line of the centre of vision. It will be understood that although reference is made to a triangular form the edges of the lenses are smooth curves.

Figure 1:
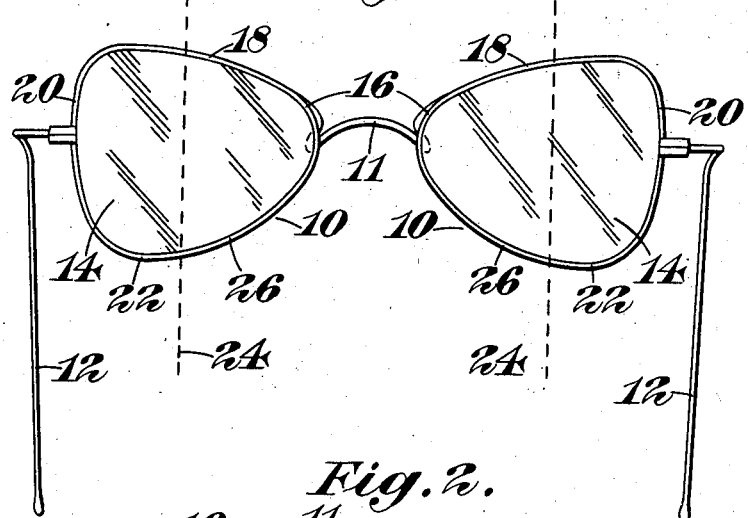
Figure 2:
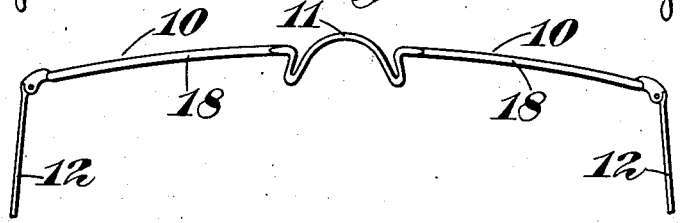
Figure 3:
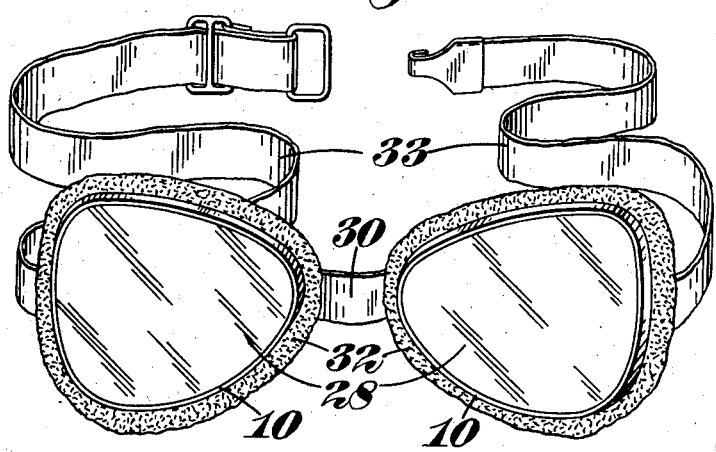

The invention is illustrated diagrammatically and by way of example in the accompanying drawing, wherein:

Figure 1 is a front elevation showing one form of spectacle frame and lenses according to the invention, Figure 2 is a plan view of the frame shown in Figure 1; and Figure 3 is a perspective view of one form of motor goggles according to the invention.

Like reference characters designate like parts in all the views.

Referring first to Figures 1 and 2, the spectacle frame which may be composed of any convenient material, for example, metal, such as steel, tortoiseshell, or the like, comprises two lens frames 10, a bridge piece 11 connecting the same and two side arms 12 which are hinged to the lens frames at points substantially level with the bridge 11. Each lens frame 10, and the lens 14 carried by the same is of curved triangular form, with the apex 16 of each triangle lying in proximity to the bridge 11. From each apex 16 which is smoothly curved, the upper side 18 of each lens frame, and also the upper edge of each lens slopes upwardly and outwardly towards the adjacent temple of the wearer when the spectacles are in use. The outer side 20 of each lens frame 10 and also the outer edge of each lens 14 is a smooth curve which lies substantially vertically when the spectacles are in use. The lowest point 22 of each lens frame 10 and of each lens 14 is located at a point which lies outside a vertical plane indicated by the line 24 passing through the centre of vision, when the spectacles are in use. The lower side 26 of each lens frame 10 and of each lens 14 is a smooth curve suited to the face of the wearer.

The described spectacle frame and each lens therefor is thus so shaped that when viewed in front elevation on the wearer, the line of junction of each lens and the frame, or the upper edge of each lens, has a somewhat flattened top which slopes outwardly and upwardly from a point near the bridge towards the temple, thereby affording a full view when the eyes are turned upwards. Further, owing to the shape of each lens frame and the contour of each lens being of curved triangular form with the upwardly and outwardly sloping upper edge, the spectacles will afford the fullest view when the eyes are turned in all directions, which is particularly important in the case of sportsmen, as bodily movement of the head upwards, downwards or sideways, may thereby be obviated when changing the direction of vision. The lenses are sufficiently large to give a very full view, and they are preferably of toric or meniscus form, but in some cases, so-called flat lenses may be used. The lenses are preferably made of splinterless glass, i. e. laminated glass.

As shown in Figure 2, the spectacle frame may be so shaped that the general planes of the two rim frames 10 as viewed in plan, form an angle with one another of such magnitude, for example about 145°, as to allow the lenses to occupy the field of vision to a maximum extent without interfering with either the comfort of the wearer or the proper optical effect of the lenses.

The invention is applicable not only to spectacles with side arms, but also to other forms of spectacles, such as pincenez and to motor goggles, as shown in Figure 3. In this construction the frames 10 are shaped as described above with reference to Figure 1, and may carry clear or tinted pieces 28 of any convenient translucent material, such as is usually employed in motor goggles. A flexible bridge 30 connects the frames 10 which may be provided with felt 32, or other convenient material for making a close fit with the face of the wearer. Alternatively, some other form of guard instead of felt or the like may be carried by the rims 10 for making a close fit with the head of the wearer to which the goggles may be secured in the usual manner by straps 33.

The invention thus provides not only complete spectacles, pincenez or motor goggles, but also lenses shaped in accordance therewith, or spectacle frames or lens frames without the lenses.

Various modifications may be made in the details of construction described above, without departing from the invention. For example, instead of attaching the side arms 12 to the frame at a point level with the bridge, if desired, they may join the frame at some other point, say at the upper and outer extremities of the frame.

I claim:—

A spectacle frame for the reception of a lens, a bridge connected to the frame substantially on a line passing horizontally through the center of vision, the upper and lower frame parts beyond the bridge inclining respectively upwardly and downwardly from such bridge throughout substantially their full lengths, the relatively outer margin frame part being substantially parallel to a line passing vertically through the center of vision, the diverging upper and lower frame parts gradually increasing the area of the sight opening from the bridge connection to the outer margin of the frame and providing the maximum area of sight opening beyond a vertical line passing through the center of vision relative to the bridge, with such maximum area of sight opening increasing upwardly and downwardly from such vertical line passing through the center of vision to the outer margin of the frame.

GERALD HENRY WINGATE.